United States Patent
Brech et al.

(10) Patent No.: US 9,911,021 B2
(45) Date of Patent: *Mar. 6, 2018

(54) CUSTOMIZED ELECTRONIC PRODUCT CONFIGURATION

(71) Applicant: International Business Machines Corporation, Armonk, NY (US)

(72) Inventors: Brad L. Brech, Rochester, MN (US); Michael E. Daley, Cedar Park, TX (US); Sunil J. Kamath, Markham (CA); Leslie Png, Los Altos, CA (US); Kevin J. Reilly, Poughkeepsie, NY (US); Steven L. Roberts, Cedar Park, TX (US); Alise Spence, Austin, TX (US); Randal C. Swanberg, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/405,347

(22) Filed: Jan. 13, 2017

(65) Prior Publication Data

US 2017/0116448 A1    Apr. 27, 2017

Related U.S. Application Data

(63) Continuation of application No. 14/868,465, filed on Sep. 29, 2015.

(51) Int. Cl.
*G06F 15/16* (2006.01)
*G06K 7/10* (2006.01)
(Continued)

(52) U.S. Cl.
CPC ......... *G06K 7/10366* (2013.01); *G06F 3/123* (2013.01); *G06F 3/1225* (2013.01);
(Continued)

(58) Field of Classification Search
CPC .......... G06F 3/1225; G06F 3/123; G06F 8/65; G06F 11/1433; G06F 3/0607; G06F 8/61
See application file for complete search history.

(56) References Cited

U.S. PATENT DOCUMENTS 5,699,275 A    12/1997    Beasley et al.
7,865,964 B2    1/2011    Narin et al.
(Continued)

OTHER PUBLICATIONS

Brech et al., "Customized Electronic Product Configuration", U.S. Appl. No. 14/868,465, filed Sep. 29, 2015.
(Continued)

*Primary Examiner* — David Lazaro
(74) *Attorney, Agent, or Firm* — Nicholas D. Bowman (57) ABSTRACT

An electronic product can be configured by a method that includes attaching a machine-readable identification (ID) tag containing an ID code to a hardware unit of the electronic product. The ID code is associated with a particular configuration of the electronic product, and can be read or scanned with a mobile device configured to send the ID code to a provider server device. In response to receiving the ID code, the provider server device can send product configuration instructions and a product configuration application to the mobile device. The product configuration instructions can guide a user through a customized series of electronic product configuration operations. The product configuration application can assist the user in performing configuration operations, can provide customized configuration help, and can establish a wireless link between the mobile device and the electronic product, allowing the user to interact with the electronic product.

1 Claim, 3 Drawing Sheets

(51) Int. Cl.
*G06F 9/445* (2018.01)
*G06K 7/14* (2006.01)
*G06F 3/12* (2006.01)
*G06F 11/14* (2006.01)

(52) U.S. Cl.
CPC ............ *G06F 8/65* (2013.01); *G06F 11/1433* (2013.01); *G06K 7/1417* (2013.01)

(56) References Cited

U.S. PATENT DOCUMENTS

| | | |
|---|---|---|
| 8,612,947 B2 | 12/2013 | LeRoux et al. |
| 8,856,288 B2 | 10/2014 | Mehta et al. |
| 9,076,006 B1 | 7/2015 | Saylor et al. |
| 9,146,839 B2 | 9/2015 | Chen et al. |
| 9,239,719 B1 | 1/2016 | Feinstein et al. |
| 9,495,145 B1 | 11/2016 | Brech et al. |
| 2011/0143661 A1 | 6/2011 | Hartwig et al. |
| 2011/0154305 A1 | 6/2011 | LeRoux et al. |
| 2012/0054738 A1 | 3/2012 | Tseng |
| 2012/0124799 A1 | 5/2012 | Addy et al. |
| 2012/0250106 A1* | 10/2012 | Kiran Kannambadi .. G06F 8/65 358/474 |
| 2013/0026220 A1 | 1/2013 | Whelihan |
| 2013/0059534 A1 | 3/2013 | Sobalvarro et al. |
| 2013/0193200 A1 | 8/2013 | O'Connor et al. |
| 2013/0262464 A1 | 10/2013 | Klane et al. |
| 2013/0299569 A1 | 11/2013 | Gentile et al. |
| 2013/0332488 A1 | 12/2013 | Christy et al. |
| 2014/0061297 A1 | 3/2014 | Smith et al. |
| 2014/0365436 A1 | 12/2014 | Calienes et al. |
| 2015/0089479 A1 | 3/2015 | Chen et al. |
| 2015/0319879 A1 | 11/2015 | Aimone |
| 2016/0087955 A1 | 3/2016 | Mohamad Abdul et al. |
| 2016/0132420 A1 | 5/2016 | Kuo et al. |

OTHER PUBLICATIONS

IBM, List of IBM Patents or Patent Applications Treated as Related, Jan. 10, 2017, 2 pages.
Brech et al., "Customized Electronic Product Configuration", U.S. Appl. No. 15/405,341, filed Jan. 13, 2017.
U.S. Appl. No. 15/070,063, Accelerated Examination Support Document, Dated Mar. 10, 2016, 11 pages.
U.S. Appl. No. 15/405,341, Accelerated Examination Support Document, Dated Jan. 6, 2017, 12 pages.

* cited by examiner

CUSTOMIZED ELECTRONIC PRODUCT CONFIGURATION

BACKGROUND

The present disclosure generally relates to configuring an electronic product. In particular, this disclosure relates to providing a customized electronic product configuration through the use of a mobile device and a provider server device.

A Quick Response (QR) code is a type of machine-readable optical label in the form of a matrix or two-dimensional barcode that can contain information about an item to which it is attached. A QR code can efficiently store data by using any of four standardized encoding modes including numeric, alphanumeric, byte/binary and kanji. In certain applications, extensions to the encoding modes can be used. A QR code image consists of black modules or square dots, arranged in a square grid on a white background, which can be captured by an imaging device such as a camera, scanner, or cell phone. The captured image can be processed using a Reed-Solomon error correction algorithm until the image can be appropriately interpreted. The encoded data can then be extracted from patterns present in both horizontal and vertical components of the image.

The QR code system can have the advantages of faster readability and greater data storage capacity, when compared to standard Universal Product Code (UPC) barcodes. Applications for QR codes can include, but are not limited to, product tracking, item identification, time tracking, document management and general marketing.

SUMMARY

Embodiments may be directed towards a computer-implemented method of configuring an electronic product. The method includes receiving, at a provider server device, from a mobile device, an electronic signal representing an identification (ID) code corresponding to a configuration of the electronic product. The method also includes the mobile device generating the electronic signal, in response to reading a machine-readable ID tag containing the ID code that is attached to a hardware unit of the electronic product. The method can also include sending, in response to receiving the electronic signal, from the provider server device to the mobile device, a set of instructions corresponding to a set of operations. The set of instructions, when executed, establish the configuration of the electronic product. The method can also include sending, in response to receiving the electronic signal, from the provider server device to the mobile device, a product configuration application. When the product configuration application is executed on the mobile device, it can connect, through a wireless communication link, the mobile device to the electronic product, and provide for an execution of at least a portion of the set of operations. The method can also include monitoring, with the provider server device in electronic communication with the electronic product, a completion status of the set of operations. The method can also include sending, in response to the monitoring, from the provider server device to the mobile device, information regarding a pending operation of the set of operations.

Embodiments may also be directed towards a system for configuring an electronic product. The system can include an electronic product, the electronic product including a wireless access point and at least one hardware unit. The electronic product can further include at least one machine-readable ID tag attached to the at least one hardware unit, each of the at least one machine-readable ID tag(s) containing a respective ID code, each respective ID code corresponding to a respective configuration of the electronic product. The system can also include a mobile device having an apparatus configured to read the at least one machine-readable ID tag and to communicate, to a provider server device, an electronic signal containing a corresponding ID code. The mobile device can be further configured to connect, in response to executing a product configuration application, through a wireless communication link, with the electronic product. The system can also include the provider server device, the provider server device containing the product configuration application and a set of product configuration instructions. The provider server device can also be configured to electronically monitor the electronic product and to download the product configuration application and the set of product configuration instructions to the mobile device.

Embodiments may also be directed towards a computer program product for configuring an electronic product. The computer program product can comprise at least one computer readable storage medium having program instructions embodied therewith, wherein the at least one computer readable storage medium is not a transitory signal per se, the program instructions executable by at least one computer processor circuit. The program instructions can cause the at least one computer processor circuit to perform a method. The method can include receiving, at a provider server device, from a mobile device, an electronic signal representing an ID code corresponding to a configuration of the electronic product. The mobile device can generate the electronic signal, in response to reading a machine-readable ID tag attached to a hardware unit of the electronic product, the machine-readable ID tag containing the ID code. The method can also include sending, in response to receiving the electronic signal, from the provider server device to the mobile device, a set of instructions corresponding to a set of operations, that when executed, establish the configuration of the electronic product. The method can also include sending, in response to receiving the electronic signal, from the provider server device to the mobile device, a product configuration application. When the product configuration application is executed on the mobile device, it can connect, through a wireless communication link, the mobile device to the electronic product, and provide for an execution of at least a portion of the set of operations. The method can also include monitoring, with the provider server device in electronic communication with the electronic product, a completion status of the set of operations. The method can also include sending, in response to the monitoring, from the provider server device to the mobile device, information regarding a pending operation of the set of operations.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

In the drawings and the Detailed Description, like numbers generally refer to like components, parts, steps, and processes.

DETAILED DESCRIPTION

Certain embodiments of the present disclosure can be appreciated in the context of providing a customized electronic product configuration for complex electronic systems that include multiple hardware cabinets and/or units. Such complex electronic systems may include, but are not limited to, supercomputers and High-Performance Computers (HPCs), which may be used to provide computational capability for the solution of Numerically Intensive Computing (NIC) tasks. While not necessarily limited thereto, embodiments discussed in this context can facilitate an understanding of various aspects of the disclosure. Certain embodiments may also be directed towards other equipment and associated applications, such as providing a customized electronic product configuration for computing systems such as a rack-mounted computer system or server, which may be used in a wide variety of computational and data processing applications. Such computing systems may include, but are not limited to, email servers, network servers, and other types of computers designed to process commercial workloads. Embodiments may also be directed towards providing a customized electronic product configuration for personal and/or consumer electronic systems such as home entertainment, personal computer and Small Office/Home Office (SOHO) computing equipment.

For ease of discussion, the terms "configure" and "configuration" are used herein, which may be generally understood to refer to the execution of operations to set up one or more pieces of electronic equipment to operate in a particular way. It may be understood that in various embodiments, establishing an electronic product "configuration" may involve a wide range of operations including hardware installation and arrangement, hardware interconnection, software installation and other operations related to setting software and system parameters.

For ease of discussion, the term "QR (Quick Response) code" may be used herein, in reference to a scheme of optically encoding data that may be read and decoded by an electronic device. It may be understood that in various embodiments, a "QR code" may be replaced by a radio-frequency identification (RFID) tag, a barcode or other type of machine-readable label or device that embodies encoded data.

The configuration and installation of electronic products such as information technology (IT) equipment can be a complex and confusing task for individuals, including system administrators and end-users, which may lack specialized configuration knowledge or skills. Such individuals may lack experience with the process of configuring an electronic product, may only configure such products infrequently, or may be unfamiliar with a configuration process or sequence specifically tailored for a customized electronic product.

Printed product documentation may be provided with the electronic product by the electronic product manufacturer, and may contain a wealth of information regarding the product configuration and use. However a large volume of product information may only serve to further confuse an individual attempting to configure the product. For example, settings or parameters specific to a customized electronic product may be difficult, within a large volume of information, for an inexperienced individual to locate and/or distinguish as necessary for the product configuration. Printed product documentation may also be easily ignored and regarded as boring, tedious, confusing and/or time-consuming.

The results of an individual attempting to configure an electronic product without having the appropriate knowledge and/or skills may include an incorrect configuration and/or install, excessive delays in the configuration process, and confusion and/or frustration of the individual. Service calls to the electronic product manufacturer may be required to resolve an incorrect configuration, which may incur unnecessary support expense to the electronic product manufacturer. The incorrect installation/configuration process and resulting necessary resolution steps may leave a purchaser and/or user of the electronic product with an unfavorable impression of the electronic product, while postponing the time at which the purchaser can receive tangible value from the electronic product.

According to embodiments of the present disclosure, a customized set of simplified step-by-step configuration instructions for a particular unique electronic product configuration can be provided to an individual through an electronic product configuration system. The system can include a provider server device in electronic communication with a mobile device and with the electronic product. The use of such configuration instructions can result in an efficient configuration process that can reduce the number of configuration errors and mitigate or eliminate user confusion, frustration and excessive configuration delay resulting from generic configuration instructions. The customized configuration instructions can be interactively presented to the user in a variety of media formats that depict the configuration steps in ways that are easily comprehended and imitated during the configuration process. Such a product configuration system may be useful in increasing overall customer satisfaction and confidence with respect to electronic products having complex configuration procedures.

In addition, one or more configuration applications can interactively monitor the configuration process and present the user with useful information pertinent to a present and/or future configuration operation. A configuration application can also be used to verify that configuration operations have been completed successfully.

Aspects of the various embodiments may be used to help a user to identify and execute specific configuration instructions quickly and confidently, which can enhance the user's experience by providing the user with detailed "expert" technical knowledge throughout the configuration process.

An electronic product configuration system according to the present disclosure can be useful for providing a consistent user interface and configuration results during custom product configurations, scale-out upgrades, maintenance operations and troubleshooting operations. Such a system can significantly reduce support costs for an electronic product manufacturer while providing 24/7 availability of specific expertise to an electronic product user.

Aspects of the various embodiments may also be useful for providing cost-effective electronic product configuration systems for use with complex electronic products, by using existing and proven electronic communication, media and database and expert systems technologies.

According to embodiments of the present disclosure, an interactive product configuration system can be used to enable rapid and accurate configuration and installation of complex electronic products. A unique product configuration code, embedded in a machine-readable ID tag attached to a hardware unit of the electronic product, can be used to identify and trigger the transmission of electronic product configuration resources and applications from a server device to a mobile device. A user can make use of a variety of applications and interactive media types, presented on the mobile device, to facilitate the electronic product configuration process.

Figure 1:
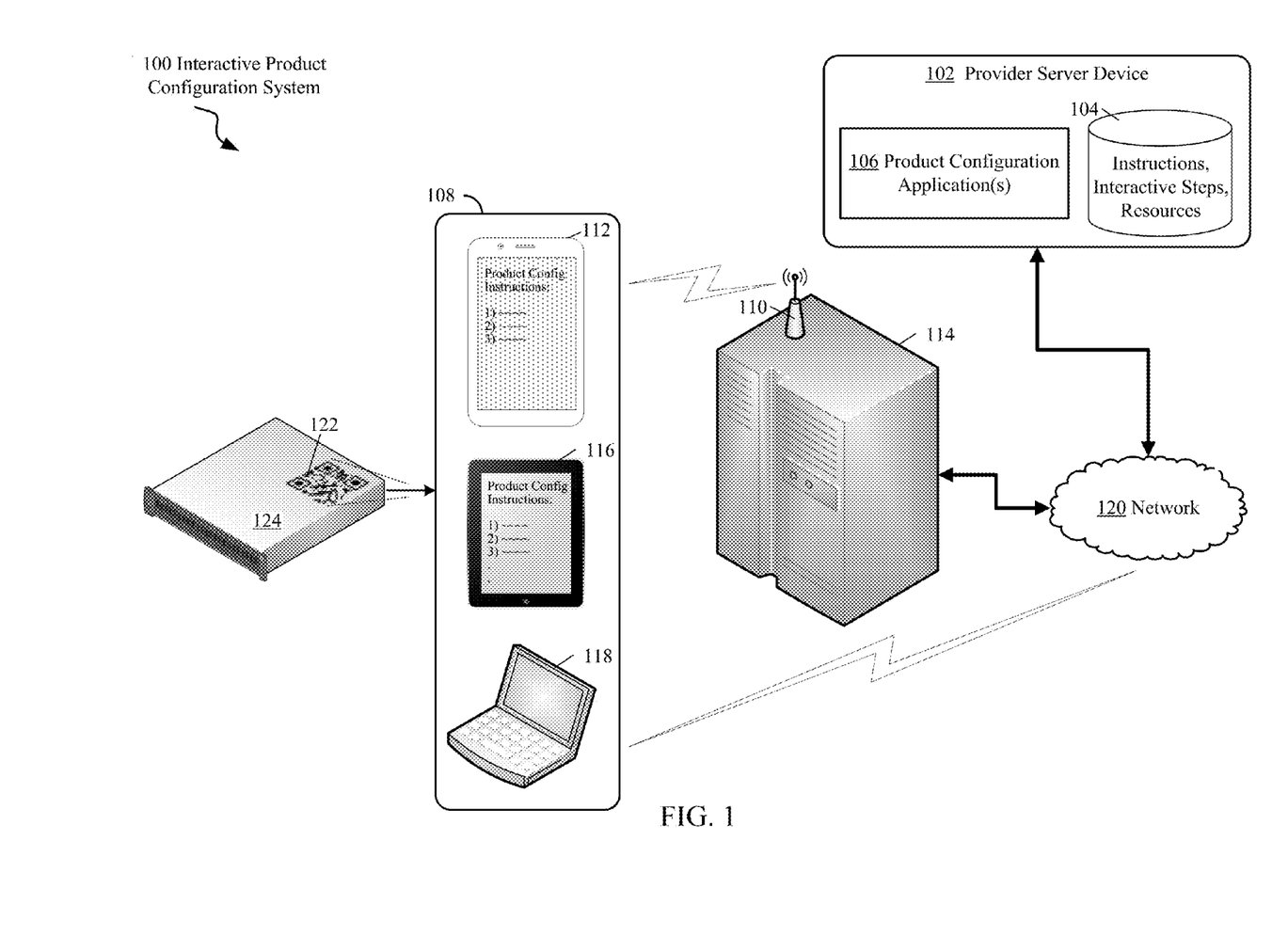
FIG. 1 depicts a block diagram of an interactive product configuration system for an electronic product, according to embodiments of the present disclosure.

Certain embodiments relate to the configuration of an electronic product in conjunction with the use of a customized, electronically provided set of configuration instructions. FIG. 1 depicts a block diagram of an interactive product configuration system 100 for an electronic product 114. The system includes mobile devices 108, a provider server device 102 and the electronic product 114, interconnected through wireless links and network 120, according to embodiments of the present disclosure. The interactive product configuration system 100 may be useful for electronically providing a set of customized configuration instructions, configuration applications(s) 106 and other resources useful for configuring the electronic product 114.

Customized configuration instructions, applications and resources provided in an automated, interactive fashion may be useful in simplifying and streamlining the product configuration process. Such instructions may be useful in reducing or eliminating errors, confusion and time spent searching a potentially vast amount of generic printed or online documentation for information and expertise pertinent to a particular electronic product configuration. Streamlining and making the product configuration process more interactive can be useful in improving a user's product configuration experience and reducing warranty support costs, by improving the quality of a product configuration. Such a streamlined product configuration process can be used for the configuration of many types of electronic equipment, including, but not limited to, consumer electronics, computers and Information Technology (IT) equipment.

Configuring an electronic product or system can include a wide range of hardware-related operations such as the installation, arrangement and interconnection, within a rack-mount or other type of chassis, of hardware units such as processor, memory, hard drive and networking modules. Hardware configuration operations can include, but are not limited to, placing and physically mounting one or more modules within a chassis, and interconnecting/routing various cables, e.g., power or Ethernet cables, between the modules.

Configuring an electronic product or system can also include the installation of software, e.g., applications, utilities, and drivers, and setting various software and system parameters that are useful to cause the software and/or hardware components to function efficiently together. In certain applications, electronic product configuration may include writing, i.e., "flashing", a customized version of firmware to one or more hardware units within the electronic product 114. In certain applications, the electronic product configuration can include identification of software and software patches to be downloaded and/or installed onto the electronic product 114.

Electronic product configuration can be performed at an initial install or set-up of the electronic product 114, during an upgrade operation, or at other times, for example, when modification of hardware and/or software configuration(s) may be useful to promote and enhance operation of the electronic product.

According to embodiments, electronic product 114 may be a computer or other type of configurable electronic product or system. In some embodiments, for example, electronic product 114 may be a rack-mounted computer or server system, and in some embodiments electronic product 114 may be a complex consumer electronic product such as a home entertainment system, or home/office computer system and/or network. According to embodiments, electronic product 114 includes a wireless access point 110 and at least one hardware unit 124. In some embodiments, the wireless access point 110 can be integrated within the electronic product 114, and in some embodiments the wireless access point 110 can be electrically attached to the electronic product 114.

According to embodiments, electronic product 114 includes at least one machine-readable ID tag 122, e.g., a QR code, attached to at least one hardware unit 124. The machine-readable ID tag 122 contains an ID code that is customized by the electronic product manufacturer after the electronic product 114 has been integrated and tested. The ID code can correspond to a particular configuration for the electronic product 114. According to embodiments, the machine-readable ID tag 122 can be a QR code, a RFID tag, a stock keeping unit (SKU), a barcode, or other type of machine-readable image or device.

In embodiments, each machine-readable ID tag 122 can contain a unique ID code that corresponds to a respective configuration of the electronic product 114. In some embodiments, more than one machine-readable ID tag 122 may be attached to the hardware unit 124, where each machine-readable ID tag 122 contains a unique ID code corresponding to a unique type of configuration that has a corresponding configuration operation sequence. Electronic product configurations may be created, for example, for the purposes of hardware installation, software installation, system upgrades, system maintenance and troubleshooting, or any combination of the above. The hardware unit 124, for example, may have an attached a machine-readable ID tag 122 containing an ID code corresponding to an initial setup of the electronic product 114, and may have another attached ID tag containing another ID code corresponding to an upgrade operation for the electronic product 114.

According to embodiments, instructions for scanning the machine-readable ID tag(s) 122 and for downloading product configuration instructions for the electronic product can be attached to the hardware unit 124. In some embodiments, the machine-readable ID tag(s) 122 and corresponding instructions for scanning the ID tag(s) 122 may alternatively be attached to, or printed on, a shipping container, such as a box or crate containing the electronic product 114. ID tag(s) 122 can be placed on a visible or top surface of a hardware unit, e.g., 124, or corresponding shipping container for the purpose of being easily noticed and scanned. In some embodiments, hardware unit 124 of electronic product 114 can be a removable module or component of hardware unit 124, for example a processor, data storage, network interface or electronic memory unit.

According to embodiments, mobile devices 108 may include devices such as a cell phone 112, a tablet device 116 and a laptop computer 118. Such mobile devices can include an apparatus, e.g., a camera or RFID reader, configured to read the machine-readable ID tag using, for example, optical image or RF signal recognition. According to embodiments, the mobile devices 108 can also be configured to communicate, through a wireless link or a network 120, an electronic signal containing an ID code corresponding to the machine-readable ID tag, to a provider server device 102. In embodiments, network 120 can be any of a variety of networks including, but not limited to, a local-area network (LAN), a wide-area network (WAN), a virtual private network (VPN) or the Internet.

According to embodiments, the provider server device 102 contains a product configuration application(s) 106 and a set of product configuration instructions, interactive steps, and resources on a storage unit 104. Storage unit 104 can be a hard disk drive, disk drive array, or other server data storage device within, or attached to, the provider server device 102.

The mobile device 108, in conjunction with the product configuration application(s) 106, can be useful as an interface through which to interact with other configuration applications 106 resident within electronic product 114. In some embodiments, a web browser running on mobile device 108 can be useful for browsing various hyperlinks provided to a user by the product configuration application(s) 106. The mobile device 108 can be further configured to establish an electronic connection with the provider server device 102, in response to sending the electronic signal containing the ID code to the provider server device 102. Once connected, the mobile device 108 can receive a product configuration application 106 from the provider server device 102. The product configuration application 106 can be used to wirelessly connect, through wireless access point 110, the mobile device 108 to a system administration portal of the electronic product 114.

In embodiments, when the mobile device 108 is running the product configuration application 106, within a wireless connection range of the wireless access point 110, the product configuration application 106 can synchronize with other configuration applications resident within electronic product 114, and provide the user with a control panel to view contextually relevant information such as configuration status and error codes, along with any suggested diagnostic or subsequent user actions.

In embodiments, provider server device 102 can be a computing device such as a computer system or server, having a storage unit 104 that is accessible by one or more processor circuits. In some embodiments, the provider server device 102 can be located within a facility of the product manufacturer, and in some embodiments, the provider server device 102 can be located at a remote location. According to embodiments, the provider server device 102 is connected to the network 120. Product configuration application 106 and the contents of storage unit 104, i.e., configuration instructions, interactive steps and resources, can be provided and maintained by the manufacturer of the electronic product.

In some embodiments, the provider server device 102 can be configured to electronically monitor the progress and/or completion of the configuration of electronic product 114. In some embodiments, the configuration monitoring can also include modifying a set of configuration instructions stored on the provider server device 102, based upon the completion status of, and user interaction with, the set of configuration operations. Such a modification, i.e., improvement, of the set of configuration instructions can be useful in improving the configuration process for subsequent electronic product configurations. Such improvements can be useful in increasing overall customer satisfaction with a particular electronic product.

Figure 2:
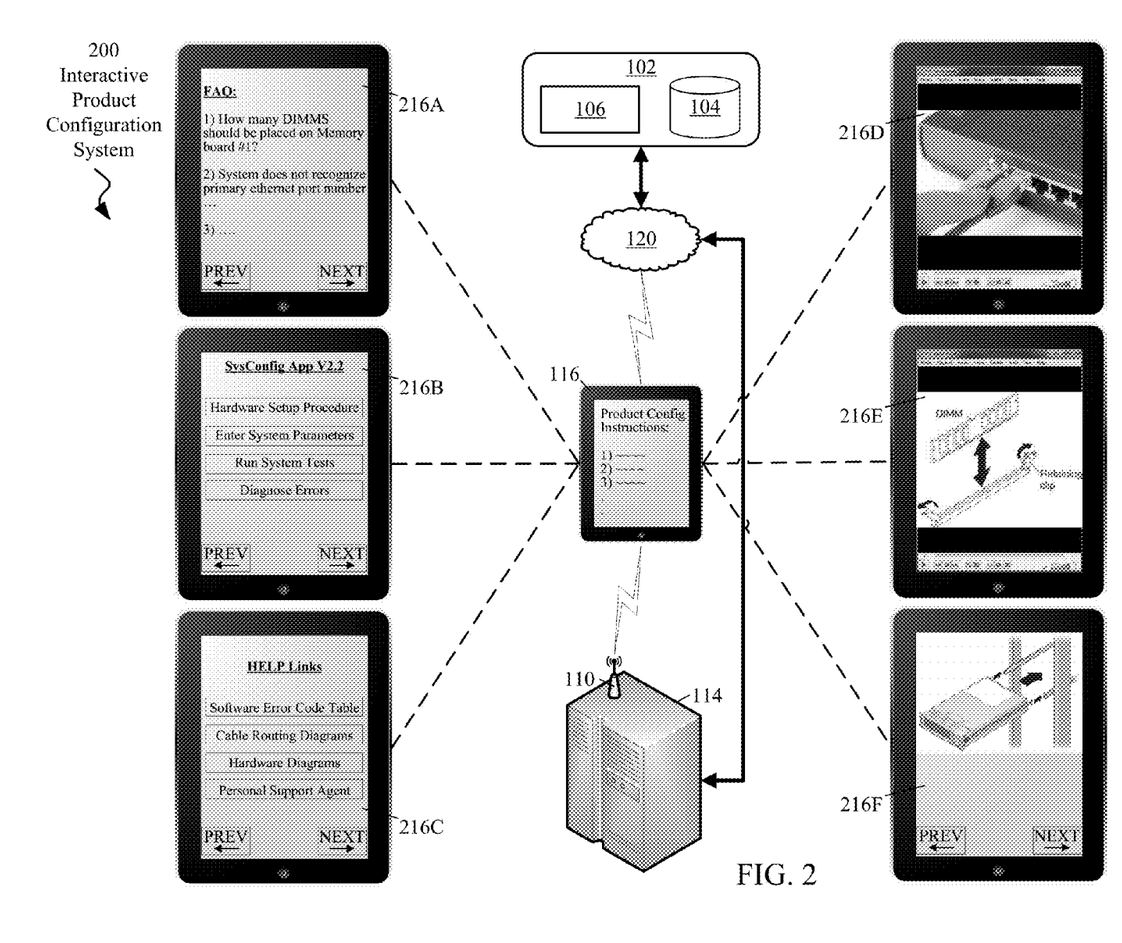
FIG. 2 depicts a block diagram of an interactive product configuration system and screen views produced by the system, according to embodiments consistent with the figures.

FIG. 2 depicts a block diagram of an interactive product configuration system 200 and screen views 216A-216F produced by the system 200, according to embodiments consistent with the figures. Screen views 216A-216F depict various display types that can be produced by a product configuration application 106. The various display types can be useful to guide, in a manner that is rapid and efficient, a user through a set of customized step-by-step operations used in configuring an electronic product 114.

According to embodiments consistent with the figures, the interactive product configuration system 200 includes an electronic product 114 that is connected to a network 120 and that has a wireless access point 110. The interactive product configuration system 200 also includes a provider server device 102 that is connected to the network 120 and has a storage unit 104 and a product configuration application 106. The interactive product configuration system 200 also includes a mobile device, depicted as a tablet device 116, which can allow a user to configure the electronic product by interacting, through the mobile device 116, with the provider server device and the electronic product 114.

According to embodiments, product configuration application(s) 106 can be downloaded from provider server device 102 onto mobile device 116 and subsequently used to display screen views including, but not limited to, 216A-216F. Such screen views may be useful for providing a user with a variety of different types of interactive displays and instructional media. Such displays and media can include, but are not limited to screens generated by one or more product configuration application(s) 106, which can allow user interaction with the application(s) 106. In embodiments, displays and media can include instructional video, one or more still images, graphics and/or drawings, e.g., "line" and/or animated drawings, data entry screens, interactive hyperlinks for acquiring help, and lists of frequently asked questions (FAQs), as well as any other displayable item Such media and displays can allow electronic product configuration data to be entered into the product configuration application 106, can allow the running of configuration test applications, and can display question and answer, i.e., FAQ, screens, feedback from the product configuration application 106, and hyperlinks within a linked web browser application.

According to embodiments consistent with the figures, screen views such as 216A-216F may be displayed on a commercially available web browser running on mobile device 116, and may employ hyperlinks to provide simple, seamless and rapid navigation from one screen view to another. For example, a "help" button displayed on a particular screen view may be bound to a hyperlink, that when executed, loads a video tutorial that instructs a user on how to connect cables between hardware units. Hyperlinks integrated into screen views may be useful in providing a user with a straightforward, integrated, efficient interactive platform from which to configure an electronic product 114.

Such an interactive platform may be useful to speed the configuration/install process and, as a result, enhance a user's positive perception of both the electronic product 114 and the electronic product manufacturer/provider.

In embodiments, screen views such as 216A-216F can be designed and arranged to lead a user through a step-by-step configuration process, using a variety of available media types, to convey information and interact with the user in ways that the user finds intuitive. For example, in some embodiments, certain types of configuration operations such as complex hardware installation and cable interconnection and routing may be most easily understood as a result of the display of graphics such as still images and/or videos. However, operations such as data/parameter entry may be more intuitively understood through displays including text and/or fillable fields. In some embodiments, the product configuration application 106 can provide the user with multiple media type choices, so that the user can choose to learn and interact with the product configuration system 200 in a way that is efficient and easily understood. Such interaction with the interactive product configuration system 200 may result in less user frustration and a faster, more accurate electronic product configuration experience, which can also result in reduced electronic product warranty and support costs.

In embodiments, screen views can be displayed and arranged in order to provide contextually relevant help to a user during a configuration process. For example, if the current configuration operation being executed involves installing the hardware unit within the electronic product 114, a display screen may list a collection of relevant help links and resources related to the hardware unit installation. The links and resources may include, for example, textual descriptions listing the relevant necessary hardware items, one or more still images depicting the specified location of the hardware unit within the electronic product 114, or a video depicting a complex series of operations used to arrange and fasten the hardware unit to the electronic product 114. Such contextually relevant help may be useful to save a user time and frustration in looking up, for example in printed documentation, the information needed to complete the configuration operation.

For simplicity of illustration, the various example screen views, e.g., 216A-216F, are depicted in FIG. 2 as screen views of a tablet device 116. However, these depictions are not limiting; screen views consistent with these may also be displayed on a cell phone, e.g., 112, FIG. 1, a laptop computer, e.g., 118, FIG. 1, or another type of mobile device.

Screen view 216A depicts a list of FAQs, which may be displayed using a web browser application on the mobile device 116. A list of FAQs may be generally useful by allowing a user to rapidly browse and search for information relevant to particular electronic product configuration operations. In embodiments, a list of FAQs can be tailored or filtered to match the context of the current step in the configuration process. For example, if a user is currently executing an operation involving a virtual machine (VM) configuration, the relevant FAQ list may include questions and answers related to logical partition sizes, memory allocation, installation of software applications on the VM, and setup of network configuration parameters for the VM.

In some embodiments, the FAQ list may be stored on a storage unit 104 of provider server device 102. In some embodiments, the FAQ list may be stored in another server or location that is accessible through a network 120, e.g., the Internet.

Screen view 216B depicts a product configuration application 106, which may allow a user to interact with a variety of software tools useful to configure the electronic product 114. In some embodiments, the product configuration application 106 may be stored on the provider server device 102, downloaded onto mobile device 116 over a network 120, and subsequently run from mobile device 116. In some embodiments the product configuration application 106 may be stored in another server or location that is accessible through a network 120, e.g., the Internet.

According to embodiments, the product configuration application 106 can be configured to connect mobile device 116 to the electronic product 114 by opening, on the mobile device 116, a control panel application that allows a user to interact with a system administration portal of the electronic product 114. In embodiments, the connection between mobile device 116 and electronic product 114 can be over a wireless link such as a Bluetooth or wireless fidelity (Wi-Fi) connection. Through a control panel application running on mobile device 116, a user may be able to perform various configuration operations by interacting with, e.g., providing input and commands to, the electronic product 114. Such configuration operations can include downloading, from provider server device 102, firmware to install into, i.e., "flash", firmware onto various hardware components, including, for example, I/O adapter cards particular to the configuration/installation.

According to embodiments, configuration options can also include storing new configuration parameters, for example, network addresses, passwords and memory allocation sizes/partition information, for subsequent use with the electronic product 114. In some embodiments, "template configurations" including predefined sets of configuration parameters can be applied, through a control panel application, to the electronic product 114.

In embodiments, a control panel application can be used to install, configure/reconfigure, and manage virtual machine(s) (VMs) on the electronic product 114. VM management operations can include starting, stopping, copying and installing application software on one or more VMs. A control panel application can also be used to partition, allocate, or resize storage areas on a hard disk drive or logical unit number (LUN). According to embodiments, a control panel application can be used to configure various parameters related to network communications such as setting network addresses, proxy settings, and address mapping tables. In conjunction with a web browser, a control panel application may make use of hyperlinks, which may be used to direct a user towards installation tests, verification tests and various electronic product management tools.

Screen view 216C depicts a listing of hyperlinks, which may be generally used to provide, in conjunction with a web browser application running on the mobile device 116, rapid access to a wide variety of electronic product configuration and troubleshooting resources. For example, in embodiments, hyperlinks may be used to direct a user to diagrams or videos depicting, for example, a physical configuration of hardware or cabling between hardware units. Hyperlinks can also be used to reference textual information, e.g., error code tables, written descriptions of configuration procedures and FAQ lists. In embodiments, a hyperlink may also be used to direct a user to a customer service/support agent who may be able to assist the user through a two-way audio and/or video link which may also allow the customer service/support agent to remotely assist in the product configuration process.

Screen views 216D-216F may be useful in providing visual depiction(s) of configurations and complex configuration operations, which may be more easily and rapidly comprehended and imitated by a user than written or verbal instructions. For example, according to embodiments, screen views 216D-216F may be used to depict the placement of one or more hardware units, e.g., hardware drawers within a rack-mount cabinet, within an electronic product 114, or the placement routing and interconnection of cables between hardware units.

Screen view 216D depicts an instructional video, which may be generally useful for visually guiding a user regarding one or more operations required to complete the configuration of an electronic product. For example, a video can be useful to rapidly convey to user the correct ports in which to insert ends of an electrical cable, or how to install a hardware unit within a rack-mount cabinet. In some embodiments, a video can be "live", i.e., video footage of actual hardware components, and in some embodiments a video may be an animation, e.g., a computer generated illustration, or series of line drawings. In some embodiments, the video can be configured to pause to allow a user to execute a configuration operation, and to resume after the operation has been executed.

Screen view 216E depicts an instructional animation, consistent with screen view 216D, which may be generally useful for visually instructing a user regarding one or more operations required to complete the configuration of an electronic product. For example, an instructional animation may be used, similarly to an instructional video, to show a user how to insert a memory module or processor module into a suitable receptacle, or to insert a printed circuit (PC) board into a connector on a backplane.

According to embodiments, and instructional animation may have advantages over a "live" video by including annotations such as labels or arrows indicating motion of a component during an install process. In some embodiments, the attributes and advantages of both "live" video and instructional animations may be combined.

Screen view 216F includes one or more still images or graphic illustrations, which may be generally useful for depicting placement, locations, and physical orientations of items such as hardware units involved in an electronic product configuration. For example, a still image that illustrates the location of a hardware drawer or unit within a cabinet or rack-mount enclosure, e.g., an exploded assembly diagram, may allow a user to quickly comprehend where to locate the hardware drawer, which fasteners to use to secure it, and how to properly fasten the drawer to the cabinet. In embodiments, other uses for still images may include installation of other hardware items including but not limited to, disk drives, memory modules, processors, power supplies and cabinet hardware items. According to embodiments, still images can also be used to illustrate complex cable interconnection, routing and placement. In some embodiments, still images can include line drawings or other types of drawn illustrations, and in some embodiments still images can include digitized photographs or images created from photographs.

Screen views such as 216A-216F are intended to illustrate some possible media types which may be helpful to a user during the configuration process for an electronic product, however the views depicted in 216A-216F are not limited in any way. Other types of screen views not described herein, or combinations of the various screen views described herein may be useful within the context of the present disclosure.

Figure 3:
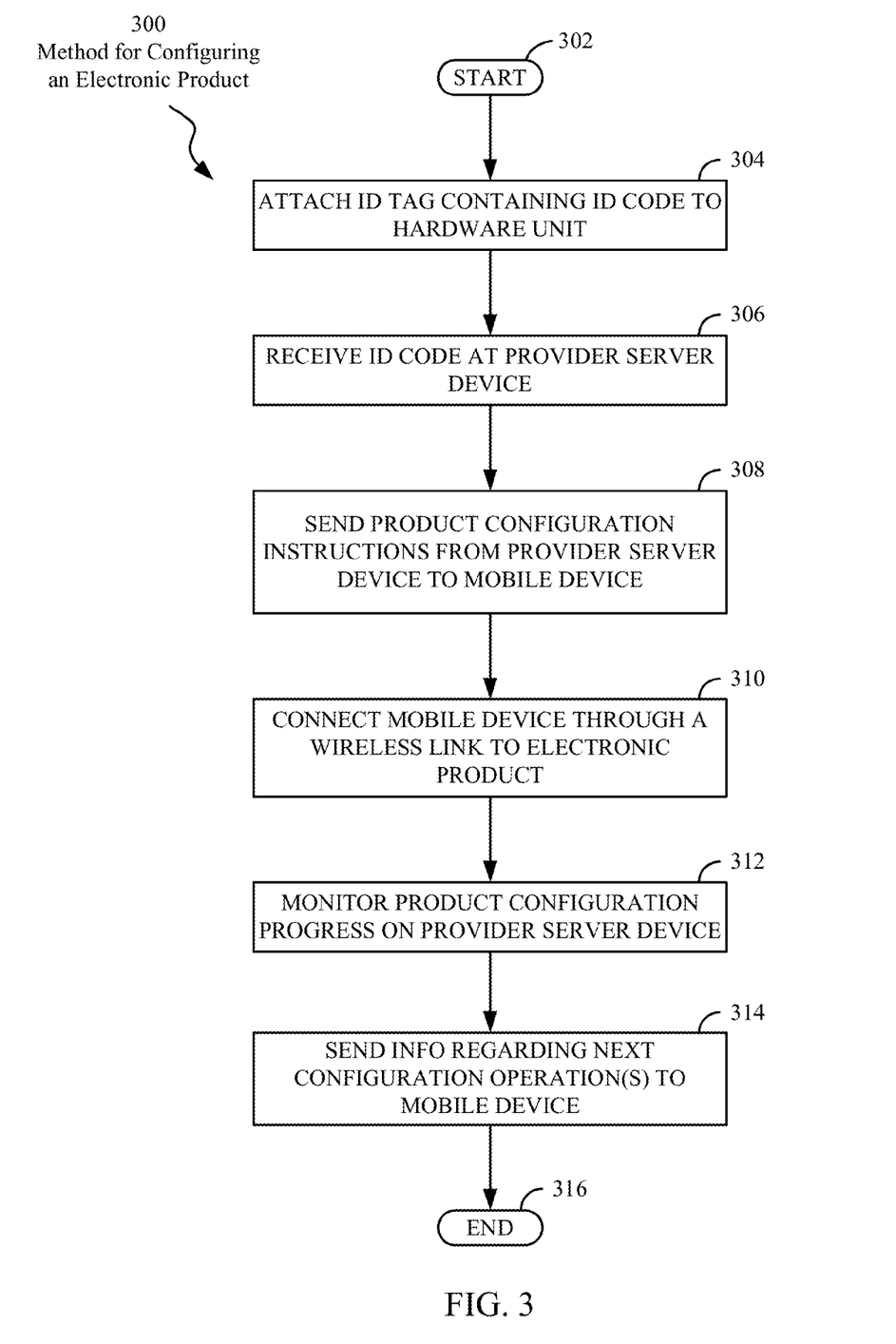
FIG. 3 depicts a flow diagram of a method for configuring an electronic product, according to embodiments consistent with the figures.

FIG. 3 depicts a flow diagram illustrating a computer-implemented method for configuring an electronic product, according to embodiments consistent with the figures. The process 300 moves from start 302 to operation 304. Operation 304 generally refers to attaching an ID tag containing a corresponding ID code to a hardware unit of the electronic product.

According to embodiments, an ID tag such as a QR code can be attached to the hardware unit by the manufacturer of the hardware unit. In some embodiments, the ID tag can be attached to the hardware unit following hardware unit assembly and testing operations. In some embodiments, a machine-readable ID tag is affixed directly to the hardware unit, and in other embodiments, a machine-readable ID tag may be affixed to a hardware unit container such as a box or crate. Instructions for scanning the machine-readable ID tag and for downloading product configuration instructions for the electronic product may, according to embodiments, be affixed adjacent to the machine-readable ID tag so that the user is likely to notice them when unpacking the electronic product.

In some embodiments, a single machine-readable ID tag may be affixed to a particular hardware unit and/or electronic product, and in other embodiments, multiple machine-readable ID tags may be affixed to the hardware unit. Multiple machine-readable ID tags affixed to a hardware unit may be useful for containing ID codes corresponding to various configuration types. For example, one ID tag may correspond to an initial configuration for a new, customized electronic product, another ID tag may correspond to an upgrade configuration for the same product, for example, a configuration corresponding to increased memory, disk space or processor capability. An ID tag may also be used to correspond to a troubleshooting configuration or sequence of operations. In some embodiments, multiple ID tags may correspond to multiple types of initial configurations of the electronic product, which may provide a user with configuration options/sequences that are easy to select and follow. The above described examples and uses of machine-readable ID tags and corresponding ID codes are not limiting in any way; additional uses may be included within the spirit and scope of the present disclosure. Once an ID tag containing a corresponding ID code is attached to a hardware unit, the process moves to operation 306.

Operation 306 generally refers to receiving, at a provider server device, an ID code read from a corresponding ID tag attached to a hardware unit of the electronic product. According to embodiments of the present disclosure, a mobile device such as a cell phone, tablet device or laptop can be configured with an optical device, i.e., camera, or another type of electronic device such as an RFID reader, and can be used to read an ID tag attached to a hardware unit of the electronic product. Once the ID tag has been read, the mobile device can also be used to extract the ID code from the ID tag, and send the ID code over an electronic signal, for example, using a wireless connection such as a cell phone, Wi-Fi, or Bluetooth connection to the provider server device. The provider server device can be configured to receive the ID code from a signal generated by the mobile device. Once the ID code is received at the provider server device, the process moves to operation 308.

Operation 308 generally refers to sending product configuration instructions from the provider server device to a mobile device. According to embodiments once the provider server device receives the ID code from a mobile device, it can send a set of product configuration instructions back to the mobile device. The set of product configuration instructions can be useful for guiding a user through a step-by-step sequence of configuration operations in a rapid, intuitive and accurate fashion. According to embodiments, the configuration instructions can include any of the interactive forms and media types discussed with reference to FIG. 2 and associated screen views 216A-216F.

According to embodiments, a set of product configuration instructions can direct a user to perform operations such as hardware installation and interconnection, setting of system parameters, software installation, software configuration, running of product configuration applications, and similar operations. A particular set of product configuration instructions can be customized by the electronic product manufacturer to bring about, when executed, a unique configuration based upon a customer's specified needs and requirements for the electronic product. Once product configuration instructions are sent from the provider server device to a mobile device, the process moves to operation 310.

Operation 310 generally refers to connecting the mobile device through a wireless link to the electronic product. According to embodiments, a product configuration application downloaded to the mobile device from the provider server device can be configured to connect the mobile device, through a wireless connection through a wireless access point of the electronic product, to the electronic product. Connecting the mobile device wirelessly to the electronic product can be useful for allowing a user to have convenient, direct access to the electronic product through the mobile device. Such access can be used to execute various product configuration commands, applications and operations on the electronic product. In some embodiments, a control panel application may be used on the mobile device to provide a user with access to a system administration portal of the electronic product. Once the mobile device is connected through a wireless link to the electronic product, the process moves to operation 312.

Operation 312 generally refers to monitoring, on the provider server device, the progress of the electronic product configuration. According to embodiments, the provider server device can be configured to electronically monitor, for example through an established wireless link, various aspects of the configuration progress. Such aspects may include the time that one or more particular configuration operations took to complete, requests from a user for help resources related to a particular configuration step, and the results of product test and/or verification applications.

Once the electronic product configuration is complete, the mobile device can send a message indicating a successful completion of the set of operations to the provider server device. According to embodiments, in response, the provider server device can electronically record the successful completion of the set of configuration operations, and register the electronic product, using data provided by the product user.

In some embodiments, the provider server device can modify a set of configuration instructions, based upon input and data gathered throughout the configuration process, to enhance, streamline, or otherwise improve the process for subsequent configuration operations and/or future users. Once the progress of the electronic product configuration is monitored, the process moves to operation 314.

Operation 314 generally refers to sending information regarding one or more subsequent configuration operations to the mobile device. In some embodiments, the provider server device can send information to the mobile device based upon monitoring of the product configuration process, and in some embodiments information can be sent to the mobile device based upon requests for help or resources, for example troubleshooting resources, from a user. In some embodiments, information sent to a user can include providing access to a technical support agent or help desk service. After the information regarding the one or more next configuration operations is sent to the mobile device, the process 300 may end at block 316.

The present disclosure may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer program product for configuring software in a removable rack-mounted computer, the computer program product comprising a non-transitory computer readable storage medium having program instructions embodied therewith, the program instructions configured to cause a processor to perform a method comprising:
   receiving, at a provider server device located remotely from the removable rack-mounted computer, from a cell phone, an electronic signal representing a Quick Response (QR) code corresponding to a configuration of the removable rack-mounted computer, the cell phone having generated the electronic signal in response to reading a machine-readable ID tag attached to a processor unit of the removable rack-mounted computer, the machine-readable ID tag containing the QR code;
   sending, in response to receiving the electronic signal, from the provider server device to the cell phone, a set of instructions corresponding to a set of operations, that when executed, establish the configuration of the removable rack-mounted computer, the set of operations including writing a customized version of firmware to the processor unit of the removable rack-mounted computer and identifying a set of software patches to be downloaded and installed onto the removable rack-mounted computer;
   sending, in response to receiving the electronic signal, from the provider server device to the cell phone, a product configuration application that, when executed on the cell phone, connects, through a wireless communication link that includes a wireless access point of the removable rack-mounted computer, the cell phone to the removable rack-mounted computer, and provides for an execution of the set of operations;
   monitoring, with the provider server device in electronic communication with the removable rack-mounted computer, a completion status of the set of operations, the monitoring including receiving, at the provider server device and from the cell phone, a message indicating a successful completion of the set of operations, the monitoring further including modifying, based upon user interaction with the set of operations, the set of configuration instructions stored on the provider server device; and
   sending, in response to the monitoring, from the provider server device to the cell phone, information regarding a pending operation of the set of operations.

* * * * *